United States Patent
Price, Jr.

[11] Patent Number: 5,638,962
[45] Date of Patent: Jun. 17, 1997

[54] TAPE CARTRIDGE STORAGE ASSEMBLY HAVING RETENTION TABS MOUNTED TO COMPARTMENT DIVIDER WALLS

[75] Inventor: Macy J. Price, Jr., Golden, Colo.

[73] Assignee: Engineered Data Products, Inc., Broomfield, Colo.

[21] Appl. No.: 645,240

[22] Filed: May 13, 1996

[51] Int. Cl.⁶ ..................................................... A47F 7/00
[52] U.S. Cl. ..................... 211/41; D6/407; 211/40; 211/88; 312/9.9; 312/9.55; 206/387.15
[58] Field of Search ................. 211/40, 41, 88; 312/9.9, 9.55; 206/387.14, 387.15; D6/407

[56] References Cited

U.S. PATENT DOCUMENTS

| | | | |
|---|---|---|---|
| 2,974,807 | 3/1961 | Furrer | 211/126 |
| 3,677,396 | 7/1972 | Staar | 206/1 R |
| 3,726,411 | 4/1973 | Jones | 211/126 |
| 3,856,369 | 12/1974 | Commiant | D6/407 X |
| 4,317,603 | 3/1982 | Pepicelli et al. | 312/9 |
| 4,396,123 | 8/1983 | Swan | 211/40 |
| 4,457,436 | 7/1984 | Kelley | 211/88 |
| 4,577,914 | 3/1986 | Stravitz | 312/10 |
| 4,600,107 | 7/1986 | Price et al. | 211/41 |
| 4,648,514 | 3/1987 | Niles | 211/41 |
| 4,678,151 | 7/1987 | Radek | 248/220.2 |
| 4,678,245 | 7/1987 | Fouassier | 206/387.15 X |
| 4,684,027 | 8/1987 | Wright | 211/40 |
| 4,730,735 | 3/1988 | Lechner | 211/41 |
| 4,741,438 | 5/1988 | Mastronardo et al. | 206/309 |
| 4,790,926 | 12/1988 | Mastronardo et al. | 211/40 X |
| 4,815,795 | 3/1989 | Accumanno et al. | 312/12 |
| 4,846,355 | 7/1989 | Price, Sr. et al. | 211/41 |
| 4,850,485 | 7/1989 | Ishikawa | 206/387.15 X |
| 4,971,199 | 11/1990 | Price, Jr. et al. | 206/387 |
| 5,072,835 | 12/1991 | Price, Jr. et al. | 211/40 |
| 5,080,231 | 1/1992 | Price, Jr. et al. | 206/387 |
| 5,238,112 | 8/1993 | Massey et al. | 206/387.15 |
| 5,292,010 | 3/1994 | Pickles et al. | 211/41 |
| 5,297,675 | 3/1994 | Martucci | 211/40 X |

*Primary Examiner*—Robert W. Gibson, Jr.
*Attorney, Agent, or Firm*—John R. Flanagan

[57] ABSTRACT

A tape cartridge storage assembly includes a housing having a pair of opposite end walls, a back wall and a floor connected to the end walls and back wall so as to define an interior cavity having an open front end and a storage arrangement disposed in the housing. The storage arrangement includes a plurality of upright divider walls connected to and rising from the floor of the housing and dividing the interior cavity of the housing into separate compartments extending from the open front end of the housing to the back wall of the housing for receiving tape cartridges standing on edge therein and also includes a plurality of retention tabs for releasably interfitting with respective notches defined on the tape cartridges when inserted into the compartments with the retention tabs being attached to the divider walls and protruding laterally into the compartments.

20 Claims, 4 Drawing Sheets

TAPE CARTRIDGE STORAGE ASSEMBLY HAVING RETENTION TABS MOUNTED TO COMPARTMENT DIVIDER WALLS

BACKGROUND OF THE INVENTION

1. Field of the Invention

The present invention generally relates to devices for storing tape cartridges and, more particularly, is concerned with a tape cartridge storage assembly having retention tabs mounted to compartment divider walls.

2. Description of the Prior Art

A variety of assemblies have been developed for the storage of computer tape cartridges as well as audio and video tape cartridges. The need for these storage assemblies has risen with the increase in use of computer tapes over the years. It is generally desirable to store tape cartridges in a location which provides convenience in access and which helps prevent loss or damage to the tape and/or the cartridge. Storage assemblies generally provide a means for securing tape cartridges in one location in order to provide the desired convenience in access and protection of each tape cartridge against loss or damage.

Representative examples of storage assemblies for tape cartridges and other articles are disclosed in U.S. Pat. No. 2,974,807 to Furrer, U.S. Pat. No. 3,677,396 to Staar, U.S. Pat. No. 3,726,411 to Jones, U.S. Pat. No. 4,317,603 to Pepicelli et al., U.S. Pat. No. 4,396,123 to Swan, U.S. Pat. No. 4,457,436 to Kelley, U.S. Pat. No. 4,577,914 to Stravitz, U.S. Pat. No. 4,600,107 to Price et al., U.S. Pat. No. 4,648,514 to Niles and U.S. Pat. No. 4,678,151 to Radek, U.S. Pat. No. 4,684,027 to Wright, U.S. Pat. No. 4,730,735 to Lechner, U.S. Pat. No. 4,741,438 to Mastronardo et al., U.S. Pat. No. 4,815,795 to Accumanno et al., U.S. Pat. No. 4,846,355 to Price, Sr. et al., U.S. Pat. Nos. 4,971,199, 5,072,835 and 5,080,231 to Price, Jr. et al.

A problem exists, however, with these prior art storage assemblies in that none of them appears to provide a comprehensive low cost solution for storing tape cartridges in terms of using a minimum amount of materials while at the same time providing a maximum amount of storage capacity and assurance of adequate retention of the stored cartridges.

Consequently, a need still exists for an assembly which provides the aforementioned comprehensive low cost solution for the storage of tape cartridges without introducing any new problems in place thereof.

SUMMARY OF THE INVENTION

The present invention provides a tape cartridge storage assembly designed to satisfy the aforementioned need. The storage assembly of the present invention provides a comprehensive low cost solution for storing tape cartridges by providing a storage assembly which is compact in size, made of a minimum amount of materials and at the same time provides maximum storage capacity within the space defined by the parameters of the assembly and sufficient assurance of retention of the stored cartridges by the storage assembly. The present invention is intended primarily for use with computer tape cartridges but can be adapted for use with audio and/or video tape cartridges as well.

Accordingly, the present invention is directed to a tape cartridge storage assembly which comprises: (a) a housing having a pair of opposite end walls, a back wall and a floor connected to the end walls and back wall so as to define an interior cavity having an open front end; and (b) a storage arrangement disposed in the housing. The storage arrangement includes means in the housing connected to and rising from the floor of the housing and dividing the interior cavity of the housing into separate compartments extending from the open front end of the housing to the back wall of the housing for receiving tape cartridges standing on edge therein. The storage arrangement also includes a plurality of retention tabs for releasably interfitting with respective notches defined on the tape cartridges when inserted into the compartments with the retention tabs being attached to the dividing means and protruding laterally into the compartments.

More particularly, the dividing means of the storage arrangement is a plurality of upright divider walls disposed in spaced apart relation from one another between the opposite end walls of the housing and having a substantially L-shaped configuration supported upon the floor of the housing and rising therefrom and extending upwardly along the back wall of the housing so as to define the plurality of compartments in the interior cavity of the housing arranged in side-by-side relation to one another for receiving the tape cartridges standing on edge therein. Each divider wall has a pair of opposite surfaces facing in opposite directions and a forward end portion projecting beyond a forward edge of the floor of the housing. The retention tabs of the storage arrangement extend from the forward end portions of the divider walls and protrude laterally into the compartments from a first of the opposite surfaces of each divider wall. The divider walls further have a plurality of tapered extension portions attached to a second of the opposite surfaces of the divider walls at the forward end portions thereof and extending toward and attached to the forward edge of the floor of the housing so as to provide reinforcement of the forward end portions of the respective divider walls.

Furthermore, the housing preferably has a pair of vertically spaced first and second floors with the second floor being disposed above the first floor and defining lower and upper portions of the interior cavity. The housing preferably has a pair of first and second storage arrangements located respectively on the first and second floors of the housing with each of the first and second storage arrangements having the divider walls and retention tabs. The back wall of the housing further has a reinforcing rib attached to a rear side thereof and having a substantially criss-cross shape and also has a plurality of hook members attached on the back wall at opposite ends of a rear side thereof for attachment of the assembly to an external frame.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which.

DETAILED DESCRIPTION OF THE INVENTION

Figure 1:
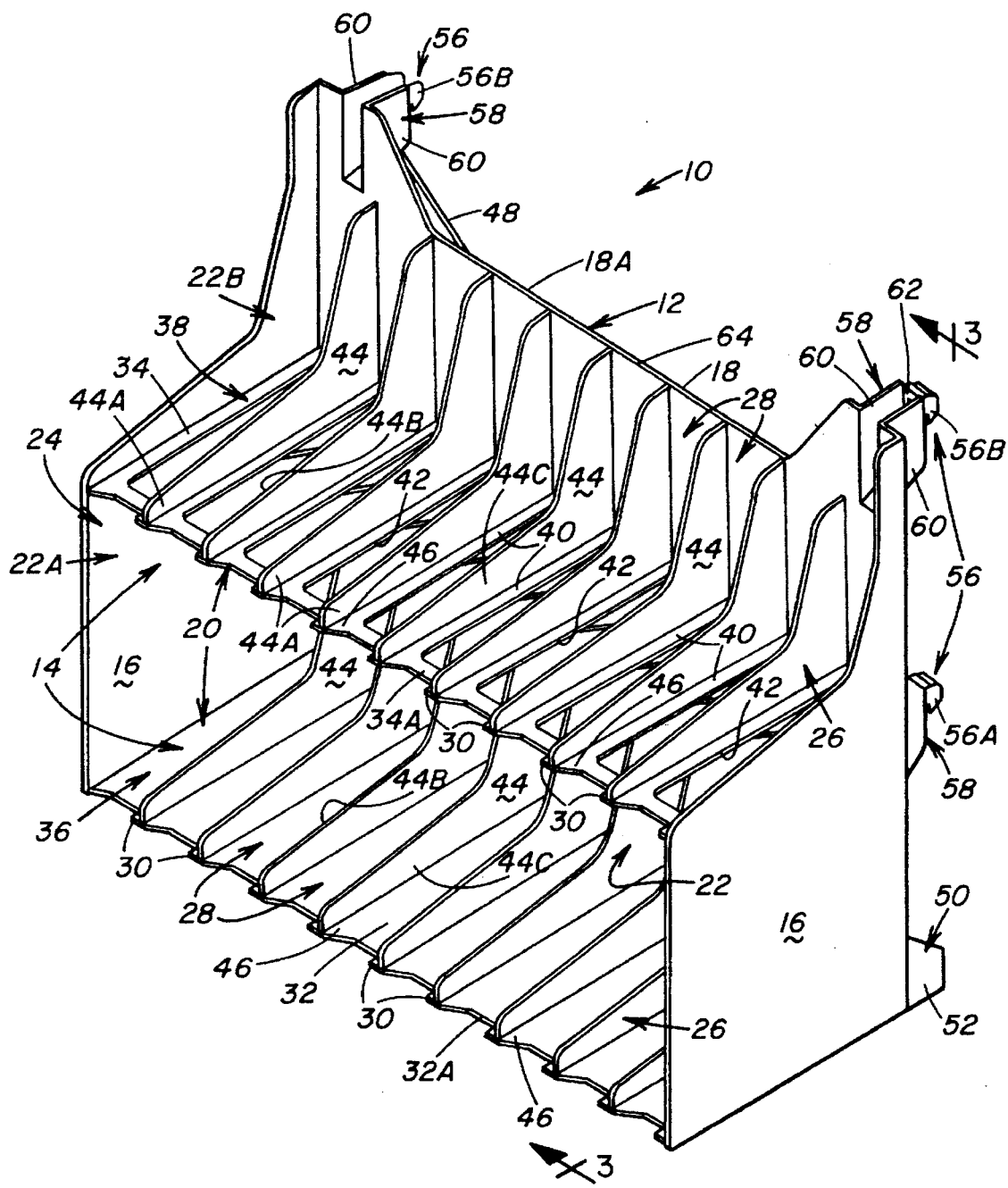
FIG. 1 is a front perspective view of the tape cartridge storage assembly of the present invention.

Referring to the drawings and particularly to FIG. 1, there is illustrated a tape cartridge storage assembly, generally designated 10, of the present invention. The assembly 10 is usable with many generally rectangular-shaped objects for which storage is desirable, but is intended for use with computer tape cartridges and may also be adapted for use with audio and/or video tape cartridges. The assembly 10 basically includes a housing 12 and at least one storage arrangement means 14 disposed in the housing 12. The housing 12 and storage arrangement means 14 are preferably constructed as a single molded unit and are made substantially of a suitable rigid plastic material but can be made of any other suitable material.

Referring to FIGS. 1–4, in its simplest form, the housing 12 of the storage assembly 10 has at least a pair of opposite end walls 16, a back wall 18 and a floor means 20 connected to the end walls 16 and back wall 18 so as to define an interior cavity 22 having an open front end 24. The storage arrangement means 14 includes a dividing means 26 connected to and rising from the floor means 20 of the housing 12 and dividing the interior cavity 22 of the housing 12 into separate compartments 28 extending from the open front end 24 of the housing 12 to the back wall 18 of the housing 12 for receiving tape cartridges C (being in phantom in FIG. 3) standing on edge therein. The storage arrangement means 14 further includes a plurality of retention tabs 30 for releasably interfitting with respective notches N defined on the tape cartridges C when inserted into the compartments 28.

In the preferred embodiment illustrated in FIGS. 1–4, the floor means 20 of the housing 12 preferably is a pair of vertically spaced first and second floors 32, 34 connected to the end walls 16 and back wall 18, with the second floor 34 being disposed above the first floor 32 and together therewith defining lower and upper portions 22A, 22B of the interior cavity 22. The distance between the first and second floors 32, 34 is greater than the height of a tape cartridge C inserted on its side edge into one of the compartments 28 on the first floor 32. The storage arrangement means 14 preferably is in the form of a pair of first and second storage arrangements 36, 38 with the first storage arrangement 36 located on the first floor 32 of the housing 12 and the second storage arrangement 38 located on the second floor 34 of the housing 12.

Figure 2:
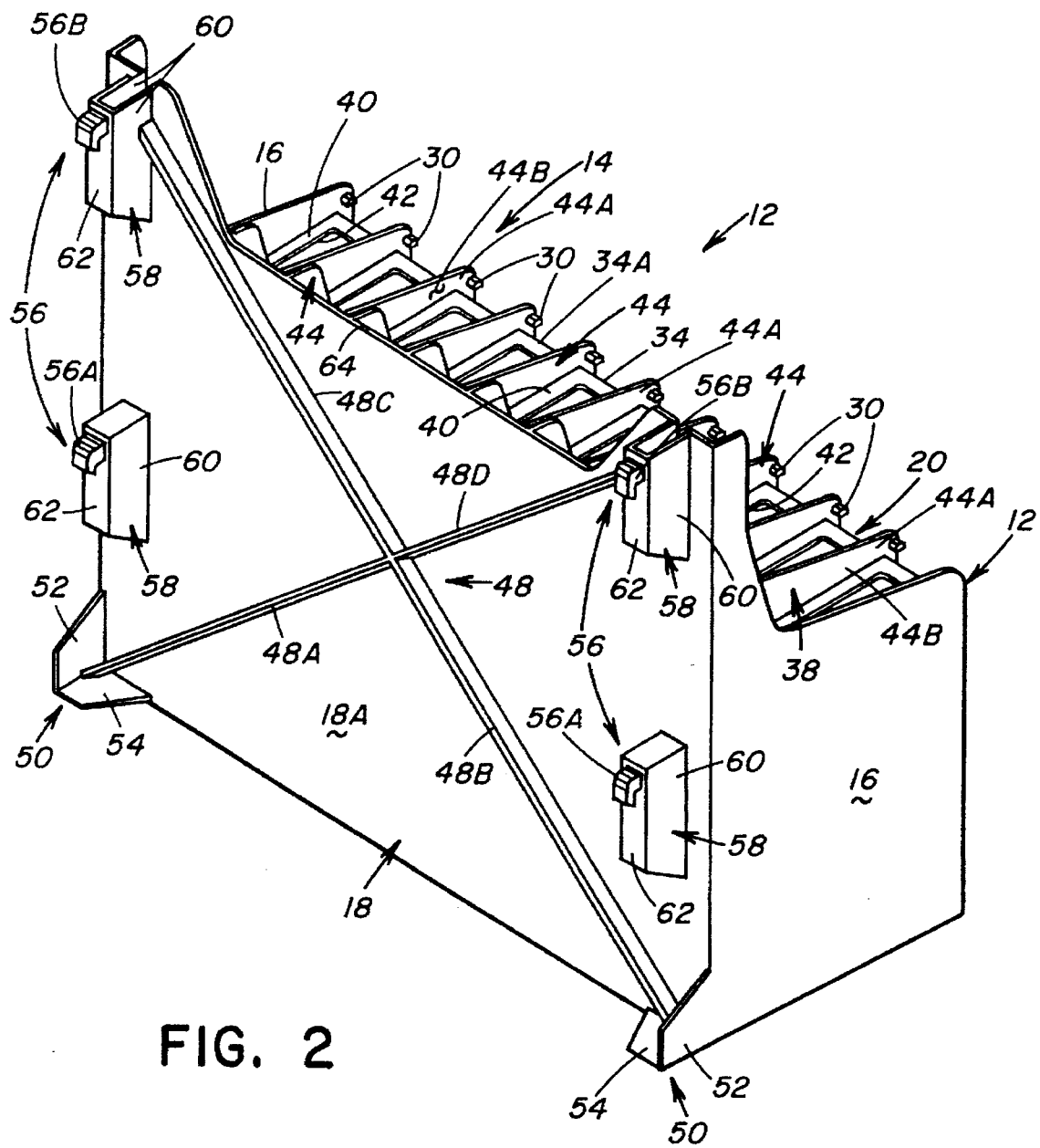
FIG. 2 is a rear perspective view of the tape cartridge storage assembly shown in FIG. 1.
Figure 3:
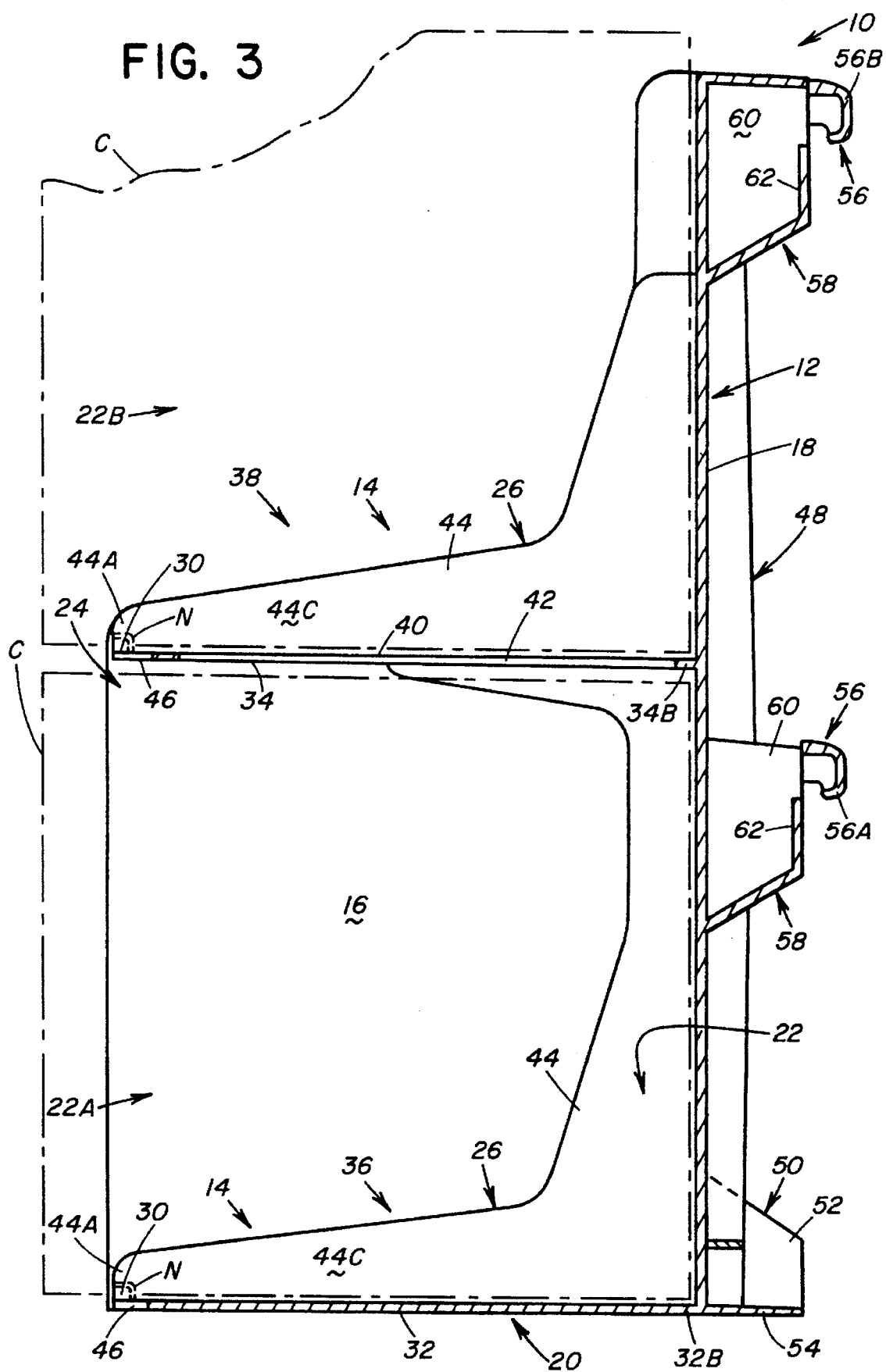
FIG. 3 is an enlarged cross-sectional side view of the assembly taken along line 3—3 of FIG. 1.
Figure 4:
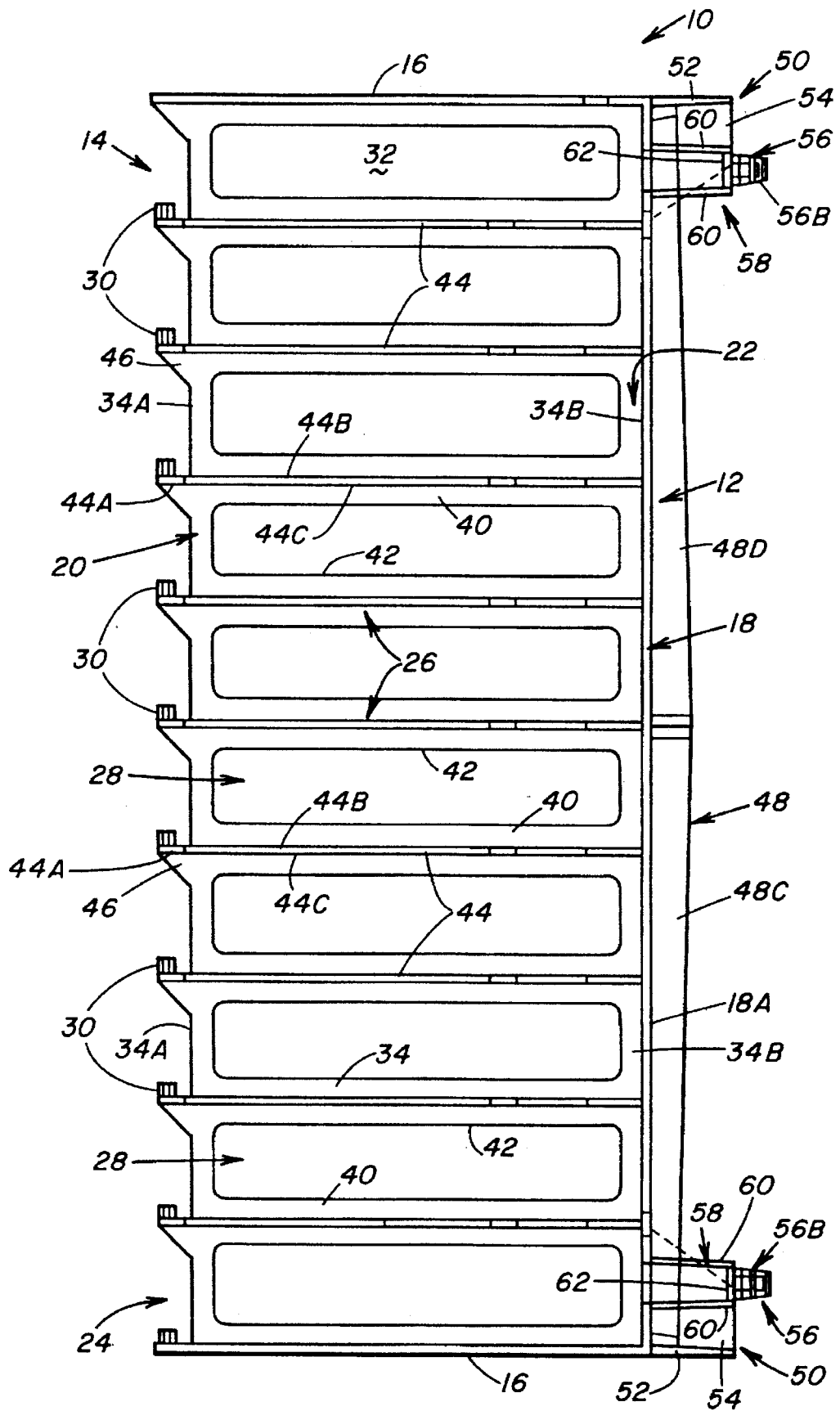
FIG. 4 is an enlarged top plan view of the assembly shown in FIG. 1.

Also, as best seen in FIGS. 1, 2 and 4, the second floor 34 of the housing 12 particularly has a plurality of annular ledges 40 for supporting the tape cartridges C thereon. The annular ledges 40 respectively define elongated openings 42 in the second floor 34 for reducing the overall mass of the assembly 10. The annular ledges 40 which represent the second floor 34 provide a surface area which is substantially less than the surface area provided by the first floor 32 but still provide sufficient structural capability to support the tape cartridges C thereon.

Each dividing means 26 is preferably an upright divider wall 44 having a forward end portion 44A which projects beyond forward edges 32A, 34A of the first and second floors 32, 34 and a pair of opposite surfaces 44B, 44C facing in opposite directions from one another toward respective ones of the opposite end walls 16 of the housing 12. The divider walls 44 are disposed in spaced apart relation from one another between the opposite end walls 16 of the housing 12 and each have a substantially L-shaped configuration supported upon either the first or second floors 32, 34 of the housing 12 and rising therefrom and extending upwardly along the back wall 18 of the housing 12. In such spaced apart relation with respect to one another, the divider walls 44 define the plurality of compartments 28 in the lower and upper portions 22A, 22B of the interior cavity 22 of the housing 12 arranged in side-by-side relation to one another for receiving the tape cartridges C standing on edge therein. Each compartment 28 has a length extending from the back wall 18 of the housing 12 to one of the forward edges 32A, 34A of the first and second floors 32, 34 of the housing 12 which is substantially greater than a width extending between the divider walls 44 and also has a length slightly less and a width slightly greater than the length and width of the tape cartridge C to be inserted therein.

The first and second floors 32, 34 also have rear edges 32B, 34B which are connected to and extend in substantially perpendicular relation to the back wall 18. The portion of each of the opposite end walls 16 extending above the second floor 34 of the housing 12 further has substantially the same side profile as each of the divider walls 44 of the second storage arrangement 38. The openings 42 defined by the annular ledges 40 of the second floor 34 of the housing 12 are also disposed between the divider walls 44.

Also, the forward end portions 44A of the divider walls 44 protrude forwardly from the forward edges 32A, 34A of the first and second floors 32, 34 of the housing 12 through a distance being only a small fraction of the length of one divider wall 44. Each divider wall 44 further has one of the plurality of retention tabs 30 attached thereon. Each retention tab 30 protrudes laterally a short distance into one of the compartments 28 from a first one 44B of the opposite surfaces 44B, 44C of a respective divider wall 44.

The first and second storage arrangements 36, 38 also include a plurality of tapered extension portions 46. Each extension portion 46 is attached to a second one 44C of the opposite surfaces 44B, 44C of the respective divider wall 44 at the forward end portion 44A thereof and extends therefrom toward and is attached to a respective one of the forward edges 32A, 34A of the first and second floors 32, 34 so as to provide lateral reinforcement of the forward end portion 44A of the respective divider wall 44.

Thus, the retention tabs 30 are disposed on the divider walls 46 at a point located forwardly from the forward edges 32A, 34A of the first and second floors 32, 34 of the housing 12. Each retention tab 30 protrudes substantially perpendicularly from the first one surface 44B of a respective divider wall 44 laterally into one of the compartments 28 through a distance substantially less than the width of the compartment 28 between the adjacent divider wall 44. The retention tabs 30 generally have multi-sided configurations and extend from lower front corners of the forward end portions 44A of the respective divider walls 44.

Referring now particularly to FIG. 2, the back wall 18 of the housing 12 preferably has a reinforcing rib 48 molded into a rear side 18A thereof. Preferably, the rib 48 has a substantially criss-cross shape although other shapes are possible. More particularly, the reinforcing rib 48 preferably has four substantially identical rib portions 48A, 48B, 48C and 48D having substantially the same dimensions as one another. Each rib portion 48A, 48B, 48C and 48D is substantially greater in length than width and has an end which terminates approximate one of the four corners of the back wall 18 of the housing 12. Further, each of the lower pair of rib portions 48A, 48B terminates at a back end wall extension portion 50. Each back end wall extension portion 50 has a pair of substantially planar vertical and horizontal segments 52, 54 which extend respectively rearwardly from the first floor 32 and one of the opposite end walls 16 of the housing 12. Also, the pair of extension portion segments 52, 54 of each extension portions 50 are arranged in substantially perpendicular relation to one another and each extension portion 50 is further a mirror image of the other.

The back wall 18 further has a plurality of hook members 56 preferably numbering four with lower and upper pairs 56A, 56B thereof disposed on the back wall 18 at opposite ends of the rear side 18A thereof for attachment of the assembly 10 to an external frame (not shown). The hook members 56B of the upper pair are generally located at the top of the back wall 18 while the hook members 56A of the lower pair are generally located approximately halfway between the top and bottom of the back wall 18. Each of the hook members 56A, 56B extends from a base portion 58 attached to and extending rearwardly from the rear side 18A of the back wall 18 of the housing 12. Each base portion 58 has a plurality of lateral side walls 60 defining a length greater than a width and supporting a rear side wall 62. Each of the lower and upper hook members 56A, 56B is attached to and extends out from a top portion of the rear side wall 62 of each base portion 58. Also, each of the upper pair of rib portions 48C, 48D terminates at an interior lateral side wall 60 of one of the base portions 58 supporting one of the upper hook members 56B. A top edge of the back wall 18 also has a recess 64 disposed between the upper hook members 56B and above the upper rib portions 48C, 48D of the reinforcing rib 48. This recess 64 reduces the overall mass of the housing 12.

It is thought that the present invention and its advantages will be understood from the foregoing description and it will be apparent that various changes may be made thereto without departing from the spirit and scope of the invention or sacrificing all of its material advantages, the form hereinbefore described being merely preferred or exemplary embodiment thereof.

I claim:

1. A tape cartridge storage assembly, comprising:
   (a) a housing having a pair of opposite end walls, a back wall and a floor connected to said end walls and back walls so as to define an interior cavity having an open front end; and
   (b) a storage arrangement disposed in said housing, said storage arrangement including
      (i) means in said housing connected to and rising from said floor thereof for dividing said interior cavity of said housing into separate compartments extending from said open front end to said back wall of said housing for receiving tape cartridges standing on edge therein, and
      (ii) a plurality of retention tabs for releasably interfitting with respective notches defined on the tape cartridges when inserted into said compartments, said retention tabs being attached to said dividing means and protruding laterally into said compartments.

2. The assembly of claim 1 wherein said dividing means of said storage arrangement is a plurality of upright divider walls disposed in spaced apart relation from one another between said opposite end walls of said housing, said divider walls being supported upon said floor of said housing and extending upwardly along said back wall of said housing so as to define said plurality of compartments in said interior cavity of said housing arranged in side-by-side relation to one another for receiving the tape cartridges standing on edge therein, each said divider wall having a pair of opposite surfaces facing in opposite directions and a forward end portion projecting beyond a forward edge of said floor of said housing.

3. The assembly of claim 2 wherein said retention tabs of said storage arrangement are attached to and extend from said forward end portions of said divider walls and protrude laterally into said compartments from a first of said opposite surfaces of each said divider wall.

4. The assembly of claim 2 wherein said storage arrangement further includes a plurality of extension portions attached to a second of said opposite surfaces of said divider walls at said forward end portions thereof and extending toward and attached to said forward edge of said floor of said housing so as to provide lateral reinforcement of said forward end portions of said respective divider walls protruding forwardly from said forward edge of said floor.

5. The assembly of claim 1 wherein said back wall of said housing has a reinforcing rib attached on a rear side of said back wall and having a substantially criss-cross shape.

6. The assembly of claim 1 wherein said back wall of said housing has a plurality of hook members attached thereon at opposite ends of a rear side thereof for attachment to an external frame.

7. A tape cartridge storage assembly, comprising:
   (a) a housing having a pair of opposite end walls, a back wall and a first floor connected to said end walls and back wall so as to define an interior cavity having an open front end; and
   (b) a first storage arrangement disposed in said housing, said first storage arrangement including
      (i) a plurality of first upright divider walls disposed in spaced apart relation from one another between said opposite end walls of said housing and having a substantially L-shaped configuration, said first divider walls being supported upon said first floor of said housing and rising therefrom and extending upwardly along said back wall of said housing so as to define a plurality of first compartments in said interior cavity of said housing arranged in side-by-side relation to one another for receiving tape cartridges standing on edge therein, each said first divider wall having a pair of opposite surfaces facing in opposite directions and a forward end portion projecting beyond a forward edge of said first floor of said housing, and
      (ii) a plurality of first retention tabs for releasably interfitting with respective notches defined on the tape cartridges when inserted into said first compartments between said first divider walls, said first retention tabs being attached to said first divider walls and protruding laterally into said first compartments.

8. The assembly of claim 7 wherein said first retention tabs of said first storage arrangement are attached to and extend from said forward end portions of said first divider walls and protrude laterally into said first compartments from a first of said opposite surfaces of each said first divider wall.

9. The assembly of claim 7 wherein said first divider walls of said first storage arrangement further have a plurality of tapered extension portions attached to a second of said opposite surfaces of said first divider walls at said forward end portions thereof and extending toward and attached to said forward edge of said first floor of said housing so as to provide lateral reinforcement of said forward end portions of the respective said divider walls protruding forwardly from said forward edge of said first floor.

10. The assembly of claim 7 wherein said back wall of said housing further has a reinforcing rib attached on a rear side of said back wall and having a substantially criss-cross shape.

11. The assembly of claim 7 wherein said back wall of said housing further has a plurality of hook members attached thereon at opposite ends of a rear side thereof for attachment to an external frame.

12. The assembly of claim 7 wherein said housing further has a second floor connected to said end walls and back wall being spaced above said first floor and dividing said interior cavity into lower and upper cavity portions.

13. The assembly of claim 12 further comprising:
   (c) a second storage arrangement disposed in said housing above said first storage arrangement, said second storage arrangement including
      (i) a plurality of second upright divider walls disposed in spaced apart relation from one another between said opposite end walls of said housing and having a substantially L-shaped configuration, said second divider walls being supported upon said second floor of said housing and rising therefrom and extending upwardly along said back wall of said housing so as to define a plurality of second compartments in said upper cavity portion of said housing arranged in side-by-side relation to one another for receiving tape cartridges standing on edge therein, each said second divider wall having a pair of opposite surfaces facing in opposite directions and a forward end portion projecting beyond a forward edge of said second floor of said housing, and
      (ii) a plurality of second retention tabs for releasably interfitting with the respective notches defined on the tape cartridges when inserted into said second compartments between said second divider walls, said second retention tabs being attached to said second divider walls and protruding into said second compartments.

14. The assembly of claim 13 wherein said second retention tabs of said second storage arrangement are attached to and extend from said forward end portions of said second divider walls and protrude laterally into said second compartments from a first of said opposite surfaces of each said second divider wall.

15. The assembly of claim 13 wherein said second divider walls of said second storage arrangement further have a plurality of tapered extension portions attached to a second of said opposite surfaces of said second divider walls at said forward end portions thereof so as to provide reinforcement said forward end portions of the respective said second divider walls.

16. The assembly of claim 13 wherein said second floor of said housing has a plurality of annular ledges for supporting the tape cartridges thereon and defining elongated openings in said second floor for reducing the mass of said assembly.

17. The assembly of claim 13 wherein said opposite end walls of said housing above said second floor thereof have substantially the same side profiles as said second divider walls of said second storage arrangement on said second floor of said housing.

18. A tape cartridge storage assembly, comprising:
   (a) a housing having a pair of opposite end walls, a back wall, and a pair of vertically spaced first and second floors connected to said end walls and back wall so as to define an interior cavity having an open front end, said second floor being disposed above said first floor and dividing said interior cavity into lower and upper cavity portions, said back wall being located along rear edges of said first and second floors;
   (b) a first storage arrangement disposed in said housing, said first storage arrangement including
      (i) a plurality of first upright divider walls disposed in spaced apart relation from one another between said opposite end walls of said housing, said first divider walls being supported upon said first floor of said housing and rising therefrom and extending upwardly along said back wall of said housing so as to define a plurality of first compartments in said lower cavity portion of said housing arranged in side-by-side relation to one another for receiving tape cartridges standing on edge therein, each said first divider wall having a pair of opposite surfaces facing in opposite directions and a forward end portion projecting beyond a forward edge of said first floor of said housing, and
      (ii) a plurality of first retention tabs for releasably interfitting with respective notches defined on the tape cartridges when inserted into said first compartments between said first divider walls, said first retention tabs being attached to said forward end portions of said first divider walls and protruding laterally into said compartments from a first of said opposite surfaces of said divider walls, said forward edge of said first floor of said housing being located rearwardly from said forward end portions of said first divider walls and said retention tabs attached thereto except for a plurality of tapered extension portions attached to a second of said opposite surfaces of said first divider walls at said forward end portions thereof and extending toward and attached to said forward edge of said first floor of said housing so as to provide lateral reinforcement of said forward end portions of the respective first divider walls protruding forwardly from said forward edge of said first floor; and
   (c) a second storage arrangement disposed in said housing above said first storage arrangement, said second storage arrangement including
      (i) a plurality of second upright divider walls disposed in spaced apart relation from one another between said opposite end walls of said housing, said second divider walls being supported upon said second floor of said housing and rising therefrom and extending upwardly along said back wall of said housing so as to define a plurality of second compartments in said upper cavity portion arranged in side-by-side relation to one another for receiving tape cartridges standing on edge therein, each said second divider wall having a pair of opposite surfaces facing in opposite directions and a forward end portion projecting beyond a forward edge of said second floor of said housing, said second floor of said housing between said respective second divider walls having a plurality of annular ledges for supporting the tape cartridges thereon and defining elongated openings in said second floor of said housing for reducing the mass of said assembly, the portion of said opposite end walls of said housing above said second floor of said housing having substantially the same side profiles as said divider walls, and
      (ii) a plurality of second retention tabs for releasably interfitting with the respective notches defined on the tape cartridges when inserted into said second compartments between said second divider walls, said second retention tabs being attached to said forward end portions of said second divider walls and protruding into said second compartments from a first of said opposite surfaces of said second divider walls, said forward edge of said second floor of said housing being located rearwardly from said forward end portions of said second divider walls and said second retention tabs attached thereto except for a plurality of tapered extension portions attached to a second of said opposite surfaces of said second divider walls at said forward end portions so as to provide reinforcement of said forward end portions of said respective second divider walls.

19. The assembly of claim 18 wherein said back wall of said housing further has a reinforcing rib attached on a rear side of said back wall and having a substantially criss-cross shape.

20. The assembly of claim 18 wherein said back wall of said housing further has a plurality of hook members attached thereon at opposite ends of a rear side thereof for attachment to an external frame.

* * * * *